April 8, 1924.

A. O. AUSTIN

INSULATOR

Filed Aug. 2, 1919

April 8, 1924.
A. O. AUSTIN
1,489,689
INSULATOR
Filed Aug. 2, 1919
4 Sheets-Sheet 2
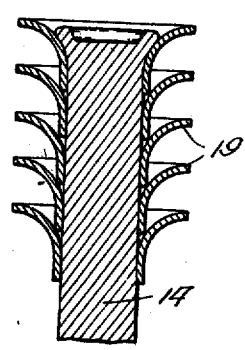
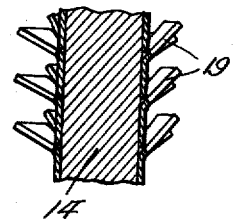
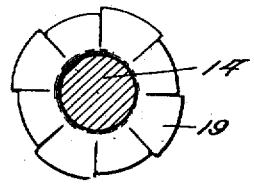
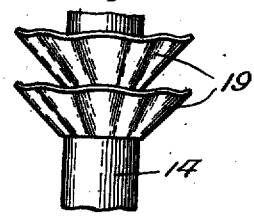
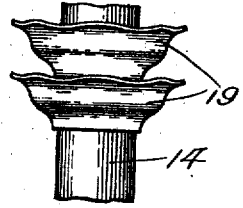
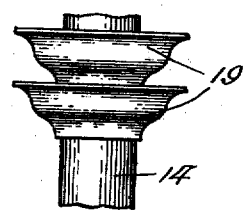
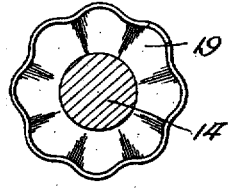
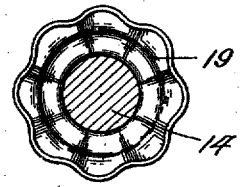
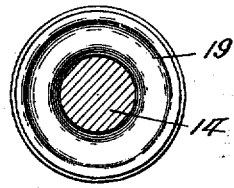
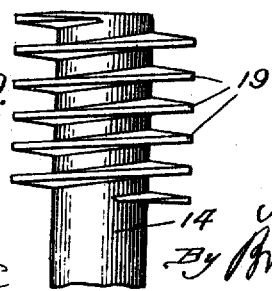

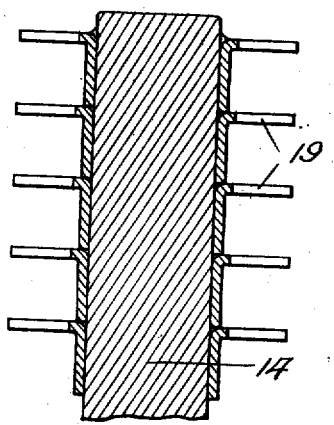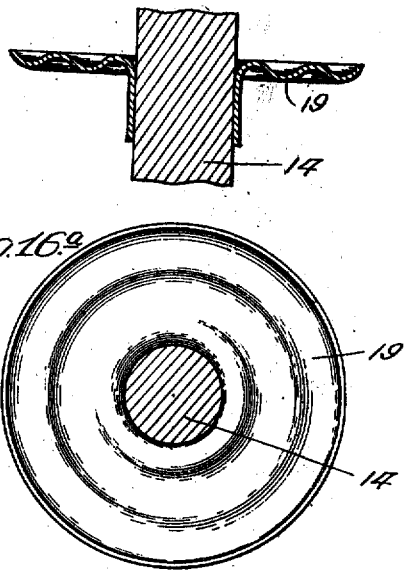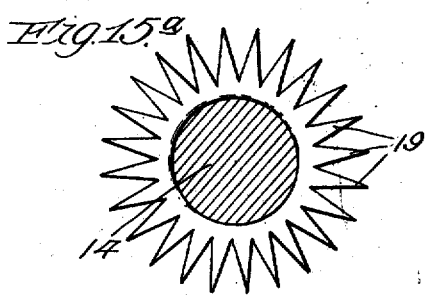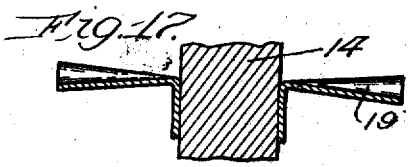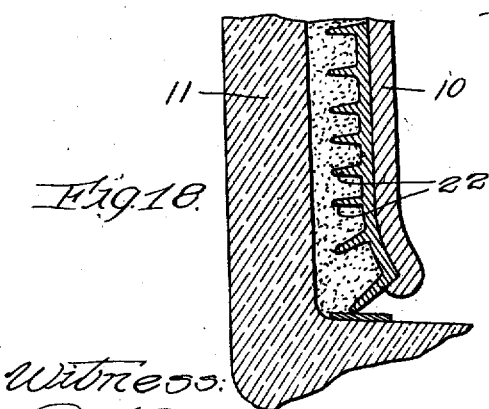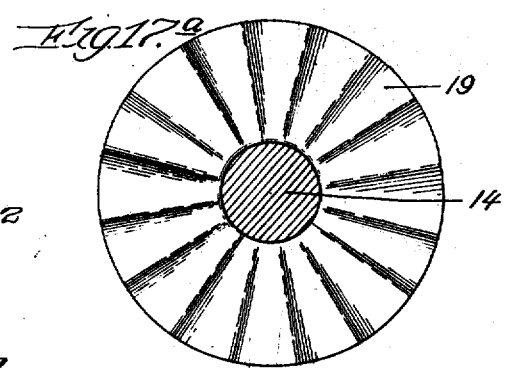

Patented Apr. 8, 1924.

1,489,689

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

INSULATOR.

Application filed August 2, 1919. Serial No. 314,875.

*To all whom it may concern:*

Be it known that I, ARTHUR O. AUSTIN, a citizen of the United States, residing at Barberton, in the county of Summit and State of Ohio, have invented certain new and useful Improvements in Insulators, of which the following is a specification.

This invention has for its object the provision of insulators in which the mechanical stresses shall be advantageously distributed and which shall be of improved construction and operation.

The invention is exemplified in the combination and arrangement of parts shown in the accompanying drawings and described in the following specification, and it is more particularly pointed out in the appended claims.

In the drawings—

Figs. 2, 3, 4, 5, 6, 7, 8, 9, 10, 11, 12, 13, 14, 15, 16 and 17 show modified forms of an insulator pin constituting part of the invention;

Figs. 5ª, 6ª, 7ª, 8ª, 15ª, 16ª and 17ª are plan views, respectively, of the constructions shown in Figs. 5, 6, 7, 8, 15, 16 and 17; and Fig. 18 is a fragmentary section of a portion of an insulator showing a modification of the connection between the insulator and cap.

The problem of the most efficient insulator construction is very greatly affected by the peculiar properties of the various available dielectrics commonly used for this purpose. Porcelain and various vitreous materials are the dielectrics most frequently used and are of a fragile nature. These materials have a very high ultimate strength under compression, the strength in compression being several times the strength in shear or tension. It is therefore desirable, of course, to design the insulators so that the parts of the dielectric which take the load will support the load by compression and so that tension and shearing stresses may be avoided as much as possible. In my prior Patent No. 1,284,976 I have shown an insulator construction designed to overcome many of the difficulties arising in the manufacture and operation of such devices, and the present invention includes a number of improvements over the invention shown in that patent. It will be readily understood that if a body of porcelain or other insulating material has a concentrated force applied to it so as to put a small part of the body under compression, the material immediately adjacent the part to which the force is applied will be under shear because the elasticity of the part under compression permits movement of that part relative to the surrounding portions of the body. In order to avoid such shearing stresses in an insulator it is important therefore that the dielectric shall not be subjected to concentrated loads, even in compression, although the load may be considerably below the ultimate strength of the material under compression. Under such conditions the dielectric would not fail in compression, but the part subjected to the force would be sheared from the surrounding portions because of the comparatively low strength of the material under shear. In designing an insulator it is therefore desirable that the force applied to the dielectric shall gradually decrease from the point at which the force is greatest toward the portions of the dielectric not subjected to such force. This arrangement will prevent adjacent portions of the dielectric from being subjected to great differences in the conditions of the forces applied thereto, which differences of condition, as explained above, give rise to shearing stresses, or to combined shear and tension.

Figure 1:
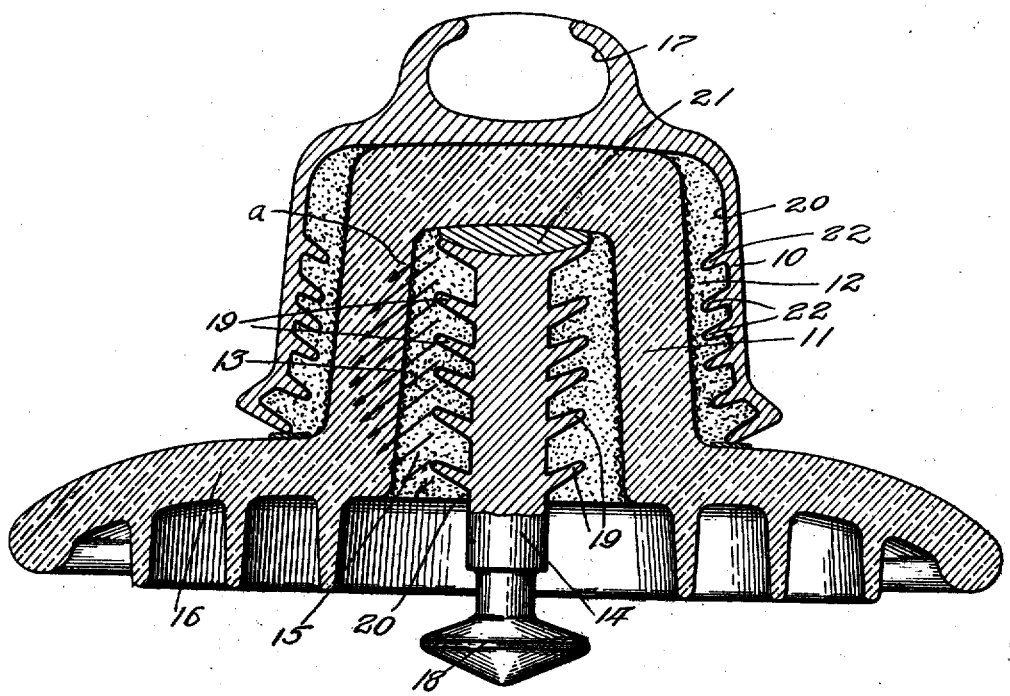
Fig. 1 is a sectional view of an insulator showing one embodiment of the present invention.

In Fig. 1 is shown an insulator having a metal cap 10 and a dielectric member 11, the two being connected by an interposed layer of suitable holding material 12, which may be Portland cement, or may be an insulating cement, or a conducting holding material, such as lead, the nature of the holding material depending upon the requirements of particular cases. The dielectric member 11 is provided with a central pin opening 13 in which a pin 14 is secured by holding material 15. The dielectric member may be provided with a flange or petticoat 16 as is common in this form of insulator. The cap 10 has a yoke 17 by which it may be suspended from any suitable support, or by which it may be connected to a head 18 on the pin of a similar insulator so that a number of insulators may be connected in series. The pin 14 is provided with a plurality of circumferential flanges 19, and the pin and the flanges are preferably coated with a layer of yielding, shrinking or elastic material 20, such as rubber, paraffine, asphaltum, paint, varnish, or other material of the same general nature. A yielding insert 21 may be placed between the end of the pin 14 and the inner end of the pin hole to relieve stresses set up by the cement or shank of the pin 14 at this point.

When the load is suspended from the lower end 18 of the pin 14 and the insulator cap 10 is supported from the yoke 17, it is apparent that the cement 15 and the porcelain 11 will be subjected to compression in the general direction of the arrows *a* in Fig. 1. This force will be sustained, of course, by force exerted by the cap 10 in an opposite direction. If the force represented by the arrows *a* in the figure is concentrated at any one particular point along the pin 14 there will be a tendency to shear the portion of the material to which the force is applied from the material directly surrounding it. It is desirable therefore to distribute the load exerted by the pin upon the surrounding fragile material throughout the length of the pin, and preferably the distribution of the load should not be uniform, but should be greatest near the central portion of the pin and gradually diminish toward each end. This arrangement prevents any sudden break in the stress to which the fragile material is subjected and so prevents danger of cracking by shear, or by combined shear and tension. Such a distribution of the load may be secured in a variety of ways. In Fig. 1 of the drawings the flanges 19 are relatively flexible and are distributed along the pin so that they are spaced farther apart toward the ends of the pin and more closely together near the center of the portion imbedded in the cement. The cement adjacent the outer end of the pin will receive its load from the flexible flanges, and since these flanges are yielding, only a portion of the load to which the pin is subjected will be transmitted to the cement and surrounding porcelain. Since the flanges are spaced comparatively widely apart at this point the amount of force transmitted to the fragile material will be relatively small. Toward the center of the pin, however, the flanges are closer together and consequently form a stiffer connection between the pin and cement so that a large amount of the force will be transmitted to the cement at this point. At the inner end of the pin the flanges are more widely spaced again so that the force transmitted to the fragile material is again decreased as the inner end of the pin is reached. This gives a distribution of force greatest near the central portion of the pin and gradually diminishing toward each end, as indicated roughly by the arrows *a* in the figure. This arrangement prevents any sudden dropping off of the stresses between adjacent portions of the fragile material, and hence avoids dangerous stress which may crack the dielectric and destroy the insulator.

It is readily apparent, of course, that the same principles which apply to the connection between the pin and the fragile material are equally applicable to the connection between the cap and the fragile material. The cap therefore may likewise be provided with a series of flexible projecting flanges shown at 22 in the drawings and arranged in a manner similar to the flanges on the pin 14 for accomplishing a like result.

Figure 2:
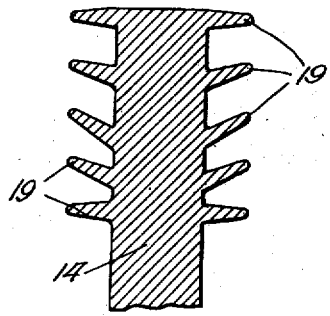

In Fig. 2 is shown a pin in which the distribution of the stresses is accomplished by variations in the angularity of the flanges 19 upon the pin 14 instead of variation in the spacing of the flanges. It will be readily apparent that a flange substantially normal to the surface of the pin will be more yielding than a flange arranged at an angle so that it forms a conical-shaped projection. The conical shape imparts stiffness to the flange and resists the yielding tendency. The distribution of the stress to which the surrounding fragile material is subjected may be regulated by changing the angularity of the flanges. It will be understood, of course, that varying conditions may necessitate variation in the manner in which the stresses are distributed. In connection with Fig. 1 it was explained that it may be desirable to have the forces gradually decrease from the central portion of the pin toward the ends, but this requirement may be changed according to forms of insulators and conditions of operation, and the flanges will, of course, be accordingly varied to secure the distribution desired.

Figure 3:
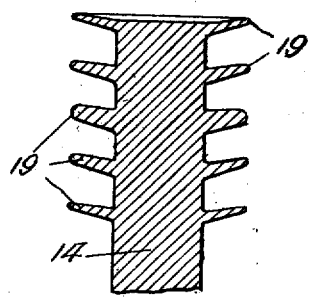

In Fig. 3 the distribution of the forces imparted to the fragile material is secured by variation in the thickness of the flanges which, of course, results in a corresponding variation in their flexibility.

In Fig. 4 a pin is shown in which the flanges instead of being formed integral with the body of the pin are stamped from sheet metal and assembled along the pin in the manner shown. The end of the pin may be riveted to prevent the flanges from sliding off the pin, and the flanges may be further held in place, if desirable, by spot welding, shrinking, galvanizing, or by any other suitable means of securing such parts together.

In Fig. 5 a series of flanges similar to those in Fig. 4 is shown, but the flanges in this case are slit radially, and the alternate sections thus formed are bent relative to one another. This arrangement gives greater flexibility than that shown in the previous figures.

In Fig. 6 a series of flanges are shown which are corrugated radially to impart resiliency to conical-shaped flanges. The conical shape is desirable for the reason that with this shape the surface of the flange which bears upon the fragile material is approximately normal to the direction of the force which the flange transmits to the surrounding dielectric or cement.

In Fig. 7 a series of flanges, corrugated both radially and laterally, are shown, and in Fig. 8 flanges having only lateral corrugations are illustrated.

In Fig. 9 the flanges are shown in the form of a wide thin thread.

Figure 10:
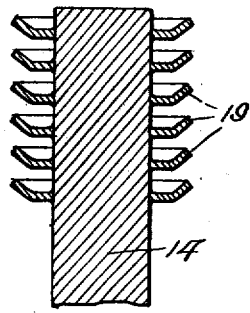
Figure 11:
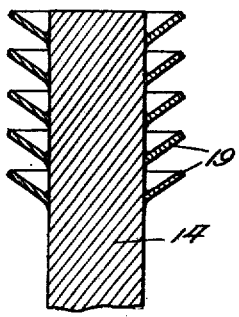
Figure 12:
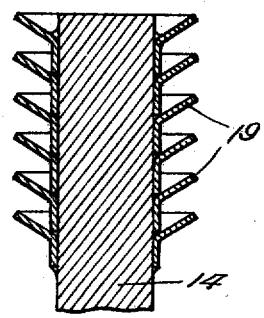

Figs. 10, 11 and 12 show various forms of flanges stamped from sheet metal and held in place on the pin by any of the means referred to in connection with Fig. 4.

Figure 13:
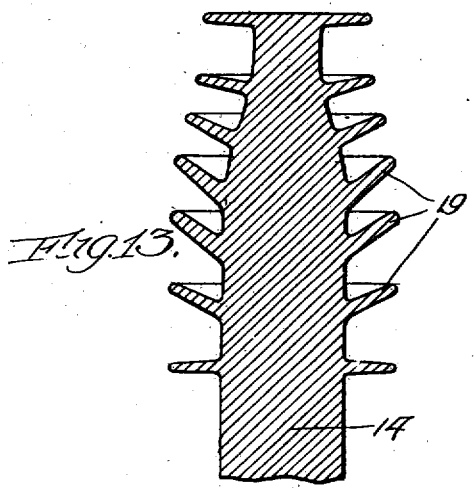

Fig. 13 illustrates a pin in which the flanges are varied in a plurality of ways for securing the desired distribution of forces in the material surrounding the pin. In this figure the flanges are spaced more closely together near the central portion of the pin in a manner similar to the arrangement shown in Fig. 1, and at the same time the central flanges are also placed at an angle to the pin to add stiffness. The diameter of the pin adjacent the inner end is also decreased so that the pin will yield at this point to the force to which it is subjected, and thus relieve the flanges adjacent the end of the pin. It is, of course, apparent that various combinations of the flange arrangements may be employed for securing desired distributions of the stresses in the dielectric.

Figure 14:
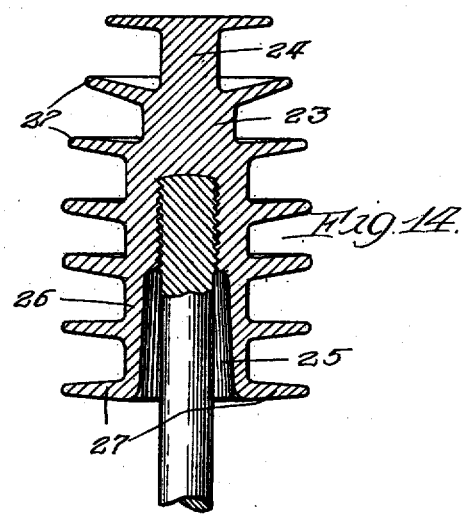

In Fig. 14 there is shown a pin in which the body member 23 is formed in a separate piece from the shank 14. The inner end of the body member 23 is reduced, as shown at 24, so that the pin elongation under the load will relieve the flange at the inner end of the pin. At its outer end the body member is recessed, as shown at 25, to form a shell 26 having a series of flanges 27 imbedded in the cement or holding material. It will be apparent that the shell 26 will be under compression, since the load is applied at the top of this portion by the threaded rod as shown in the figure, and the shell is supported by the flanges secured to the shell below the point of application of the load, and if it is made comparatively thin so as to yield under the force to which it is subjected, this yielding will relieve the flanges at the outer end of the pin in the same way that the flanges at the inner end of the pin are relieved by the pin elongation.

In Fig. 15 a cross-sectional view of a pin is shown having resilient members consisting of a series of sets of radially extending points. These points may be formed on collars similar to those shown in Fig. 4, or may be secured to the pin in any other efficient manner. This arrangement produces a high degree of flexibility in the projecting members.

Figs. 16 and 17 illustrate flanges corrugated in a manner similar to Figs. 6 and 8, respectively, but the flanges are normal to the axis of the pin instead of being arranged at an angle. This gives a high degree of flexibility.

Fig. 18 shows a modification of the cap in which the projections are formed in a separate piece and secured within the cap proper. It will be understood that the form of the projections on the cap may be varied in the same manner as described in connection with the pins.

Where a hard strong cement is used for connecting the metal parts of the insulator to the dielectric it is desirable to provide for a cushioning action between the metal and the cement. As illustrated in Fig. 1, this may be done by coating or dipping the metal parts in a yielding, shrinking or elastic material, such as rubber, paraffine, asphaltum, paint, varnish, or similar substances, and such a coating of yielding material is illustrated at 20 in Fig. 1 of the drawings. The coating may be applied to the pin and cap alike, and it is usually desirable to coat the shank of the pin, as well as the flanges. A uniform coating may be given to the metal parts, or in some cases it may be desirable to vary the coating according to requirements. For instance, it might be desirable to coat the bases of the flanges 19 more heavily than the portions of the flanges adjacent their outer periphery in order to secure the proper resilient action of the flanges, or restrict the bearing to the outer edge. It may be advantageous in some cases to relieve certain parts of the metal by wrapping with yielding tape or string, or by covering with paper or other yielding material. The use of yielding flanges in combination with a coating of yielding material produces an arrangement much less liable to crack the fragile material than that in which a rigid metal part is given a coating of yielding or elastic material. Where the metal part is rigid and a coating of yielding material is used, if the coating is not uniform, it is apparent that the load will be concentrated at any point where the coating is thin and the metal is closely adjacent the fragile material or holding medium, for the reason that the load is not relieved at such a point while it is over other portions of the connected surfaces. This concentration of the load produces shearing or other dangerous stresses in the manner previously explained and tends to break the dielectric. For this reason it is dangerous to use a coating in connection with a rigid metal part, and particularly a part which requires a plurality of flanges to carry the stress. Where the metal part is provided with yielding members like the flanges described in connection with the various figures, a thin place on the coating is not so material. The resiliency of the flange itself will overcome the tendency to concentrate the load at a point where the coating on the flange is thin and thus prevent the shearing action or dangerous stress which would result if the metal part were rigid. It is thus seen that the yielding contact members make it possible to use a coating of yielding material between the metal and fragile parts without the danger of cracking, due to concentration of the load where the coating happens to be thin.

It will be apparent that the coating 20 is of great advantage in overcoming the effects of unequal expansion of the insulator parts due to temperature changes. If a metallic part were rigidly imbedded in cement any unequal expansion would tend to crack and break the cement or insulating member, but where clearance is provided by the use of a yielding coating between the two members, or by a coating which shrinks after it is in place, the danger of such breakage, due to unequal expansion, is very materially reduced.

In cases where it is desirable to use a connecting material which will flow under pressure, such as lead, the resilient projections on the cap and pin for engaging the connecting material are especially advantageous for the reason that any necessary yielding action is accommodated by the yielding projections, and hence permanent deformation of the connecting material is prevented.

The benefits secured by this invention are emphasized in insulators that must carry very heavy loads for the reason that it is possible to work the fragile material of the insulator at higher stresses per unit area. This results in higher possible loads without making the insulator excessively large with accompanying increased weight and hazard of breakage.

I claim:

1. An insulator comprising a dielectric member and a connecting member secured together, and means for producing a graded distribution of the stresses transmitted from one of said members to the other to prevent excessive shearing action in said dielectric member.

2. An insulator comprising a dielectric member and a connecting member, said connecting member having resilient means thereon for transmitting force between said members, said resilient means being arranged to produce a graded distribution in said dielectric member of the force transmitted.

3. An insulator comprising a dielectric member and a connecting member secured together, said connecting member having a plurality of resilient projections thereon for transmitting force from said connecting member to said dielectric member, said resilient projections being arranged to transmit varying amounts of said force at different positions on said connecting member to effect a graded distribution of the stresses transmitted to said dielectric member from said connecting member.

4. An insulator comprising a dielectric member and a connecting member secured thereto, said connecting member having a plurality of resilient projections thereon for transmitting force from one of said members to the other, said projections being unevenly arranged upon said connecting member to effect a graded distribution of the stresses imparted to said dielectric member by said connecting member.

5. In combination, a metallic fitting for an insulator comprising a pin having a plurality of resilient projections unequally distributed thereon in the direction of the length thereof, a dielectric member having an opening therein for receiving said pin, and cement for securing said pin to said dielectric member, said cement substantially filling the spaces between said projections.

6. An insulator comprising a dielectric member and a metallic connector secured thereto, and resilient means on said connector for transmitting force from said connector to said dielectric member at various points along said connector, said resilient means being arranged to produce different degrees of resiliency in the connection between said dielectric member and said connector at different points along said connector.

7. An insulator comprising a dielectric member and a connector, and means for resiliently securing said connector to said dielectric member, said resilient securing means being arranged to produce different degrees of resiliency between said connector and said dielectric member at different points along said connector to effect a gradually varying predetermined distribution of the stresses imparted to said dielectric member by said connector.

8. A metallic connecting member for an insulator having resilient means thereon for securing said connecting member to said insulator, said resilient means being arranged on said connecting member to produce different amounts of resiliency at various positions along said connecting member so that force exerted by said connecting member upon said insulator will be unevenly transmitted to said insulator by said resilient means.

9. A metallic fitting for an insulator comprising a pin having a plurality of resilient flanges thereon for securing said pin to an insulator, said flanges being arranged with varying amounts of resiliency at different points along the length of said pin.

10. An insulator comprising a pin having a plurality of resilient flanges distributed longitudinally thereof for securing said pin to an insulator, said flanges being arranged to permit greater resiliency in the connection between said pin and said insulator adjacent the end of said pin than at other points along the length thereof.

11. An insulator comprising a metallic member and a dielectric member, means for securing said members together, and resilient means on said metallic member for transmitting force to said dielectric member, said resilient means being arranged to produce a graded distribution of the force transmitted from said metallic member to said dielectric member.

12. An insulator comprising a dielectric member having an opening therein, a metallic pin cemented in said opening, and a plurality of resilient flanges spaced along said pin and arranged to produce varying degrees of resiliency in the connection between said pin and said dielectric member at different points along the length of said pin.

13. An insulator comprising a connector having resilient flanges thereon for securing said connector to a dielectric member, said flanges being unequally spaced along the length of said connector to effect graded distribution of the force transmitted from said connector to said dielectric member.

14. An insulator comprising a dielectric member and a metallic member, said metallic member having resilient projections thereon for securing said metallic member to said dielectric member, said resilient projections being arranged to afford varying amounts of resiliency at different points along said metallic member, and a coating of yielding material interposed between said metallic member and said dielectric member.

15. A metallic fitting for an insulator comprising a pin having a plurality of circumferential flanges spaced along the length thereof, said flanges differing in resiliency from one another.

16. An insulator pin having a plurality of resilient flanges distributed along the length thereof, the central ones of said flanges being arranged to afford greater resistance to resilient movement than the flanges at the ends of the series.

17. A metallic fitting for an insulator comprising a pin having a series of circumferential resilient flanges unequally spaced from one another along the length thereof.

18. A metallic fitting for an insulator comprising a pin having a series of resilient circumferential flanges thereon, said flanges differing in thickness from one another.

19. A metallic fitting for an insulator comprising a pin having a plurality of resilient flanges thereon, said flanges being arranged at different angles relative to the axis of said pin.

20. A metallic fitting for an insulator comprising a pin comprising a plurality of circumferential resilient flanges arranged thereon, said flanges being of different thickness and being unequally spaced along said pin and being arranged at different angles relative to said pin.

21. A metallic fitting for an insulator comprising a pin having a plurality of resilient projections thereon, said projections being in the form of flanges each of which surrounds said pin as a separate ring from the flange adjacent thereto, said pin having different diameters at different positions along the length thereof.

22. A metallic fitting for an insulator comprising a pin having different diameters at different positions along the length thereof, and a plurality of yielding flanges unequally spaced along said pin.

23. An insulator comprising a dielectric member and a connecting member secured thereto so that force may be transmitted from one member to the other, and means for producing a gradually varying distribution of the force transmitted from one of said members to the other to prevent excessive dangerous stresses in said dielectric member.

24. An insulator comprising a supporting member and a dielectric member secured together by holding material, and resilient flanges on said supporting member unequally spaced along the length thereof to effect graded distribution of the force transmitted from said supporting member to said holding material.

25. An insulator comprising a dielectric member and a metallic member secured together by holding material, said metallic member having resilient projections thereon for engaging said holding material, said resilient projections being arranged to afford varying amounts of resiliency at different points along said metallic member, and a coating of yielding material interposed between said metallic member and said holding material.

26. A metallic fitting for an insulator comprising a pin having a plurality of resilient projections spaced along the length thereof, said projections differing in resiliency from one another according to their distribution along the length of the pin.

27. An insulator pin having a plurality of resilient projections distributed along the length thereof, the projections centrally positioned relatively to the length of said pin being arranged to afford greater resistance to resilient movement than the projections adjacent the ends of the series.

28. A metallic fitting for an insulator comprising a pin having a series of resilient projections thereon, said projections differing from one another in thickness according to their longitudinal position on said pin.

29. A metallic fitting for an insulator comprising a pin having a plurality of resilient projections thereon, said projections differing from one another in resiliency and being unequally spaced along said pin.

30. A metallic fitting for an insulator comprising a pin having a longitudinally spaced series of circumferential projections arranged thereon, said projections being graded in resiliency at different positions along the length of said pin.

31. An insulator comprising a dielectric member and an attaching member, and means for producing a gradually varied distribution of the force transmitted from one of said members to the other.

32. An insulator comprising a dielectric member, an attaching member, and resilient projections on one of said members for transmitting force from one of said members to the other and for producing a graded distribution of the force transmitted.

33. An insulator comprising a dielectric member, an attaching member secured thereto, and resilient means on one of said members for transmitting stress from one member to the other, the resiliency of said transmitting means being graded to produce a graded variation in the force transmitted.

In testimony whereof I have signed my name to this specification on this fifteenth day of July, A. D. 1919.

ARTHUR O. AUSTIN.